United States Patent [19]

Krauss et al.

[11] 4,309,583
[45] Jan. 5, 1982

[54] HEAT-TREATING APPARATUS FOR PROLONGING THE LIFE OF A PRESSURE VESSEL, ESPECIALLY A REACTOR PRESSURE VESSEL

[75] Inventors: Peter Krauss, Erlangen; Ewald Müller, Neunkirchen; Horst Pörner, Erlangen; Robert Weber, Uttenreuth, all of Fed. Rep. of Germany

[73] Assignee: Kraftwerk Union Aktiengesellschaft, Mulheim an der Ruhr, Fed. Rep. of Germany

[21] Appl. No.: 37,121

[22] Filed: May 8, 1979

[30] Foreign Application Priority Data

May 10, 1978 [DE] Fed. Rep. of Germany ....... 2820442

[51] Int. Cl.³ .................... H05B 6/10; H05B 6/38; G21C 13/00
[52] U.S. Cl. .................... 219/7.5; 219/10.57; 219/10.67; 219/10.79; 219/50; 219/537; 219/535; 219/437; 432/225; 165/75; 376/308; 376/463
[58] Field of Search ............ 176/87, 38, 19 R; 219/436, 437, 536, 535, 50, 537, 10.57, 549, 10.43, 544, 6.5, 7.5, 10.67, 10.75, 10.79, 10.49 R; 432/62, 225, 226, 65, 96; 148/145, 146; 165/73, 74, 75; 166/59, 60, 302

[56] References Cited

U.S. PATENT DOCUMENTS

| | | | |
|---|---|---|---|
| 2,506,853 | 5/1950 | Berg et al. | 432/62 X |
| 3,403,240 | 9/1968 | Henderson et al. | 219/10.79 |
| 3,809,608 | 5/1974 | Katz et al. | 219/50 X |
| 3,864,543 | 2/1975 | Mohr | 219/10.49 X |
| 4,158,604 | 6/1979 | Cook et al. | 176/38 X |

*Primary Examiner*—Gene Z. Rubinson
*Assistant Examiner*—Philip H. Leung
*Attorney, Agent, or Firm*—Herbert L. Lerner

[57] ABSTRACT

Heat-treating apparatus for prolonging the life of a pressure vessel formed of thermally resistant material subject to time-dependent structural changes due to neutron flux includes a heating device positionable within a pressure vessel adjacent to a wall portion thereof which is to be heat-treated; and a mounting support for the heating device including a hollow substantially cylindrical mounting member. Also included is a support for the mounting member by which the latter is insertable into and removable from the pressure vessel through an opening in the pressure vessel. The apparatus additionally includes a device for flooding the interior of the pressure vessel with protective liquid preparatory to inserting and removing the mounting member and the heating device from the pressure vessel, and a device for draining the protective liquid from the interior of the pressure vessel prior to actuation of the heating device for heating the adjacent wall portion. The mounting member is an insulating cylinder having outer circumferential contact surfaces and is positionable so that the contact surfaces form sealing contact with the inner peripheral surface of the pressure vessel in a manner that the insulating cylinder defines an annular heating space located adjacent the pressure-vessel wall portion to be treated.

16 Claims, 11 Drawing Figures

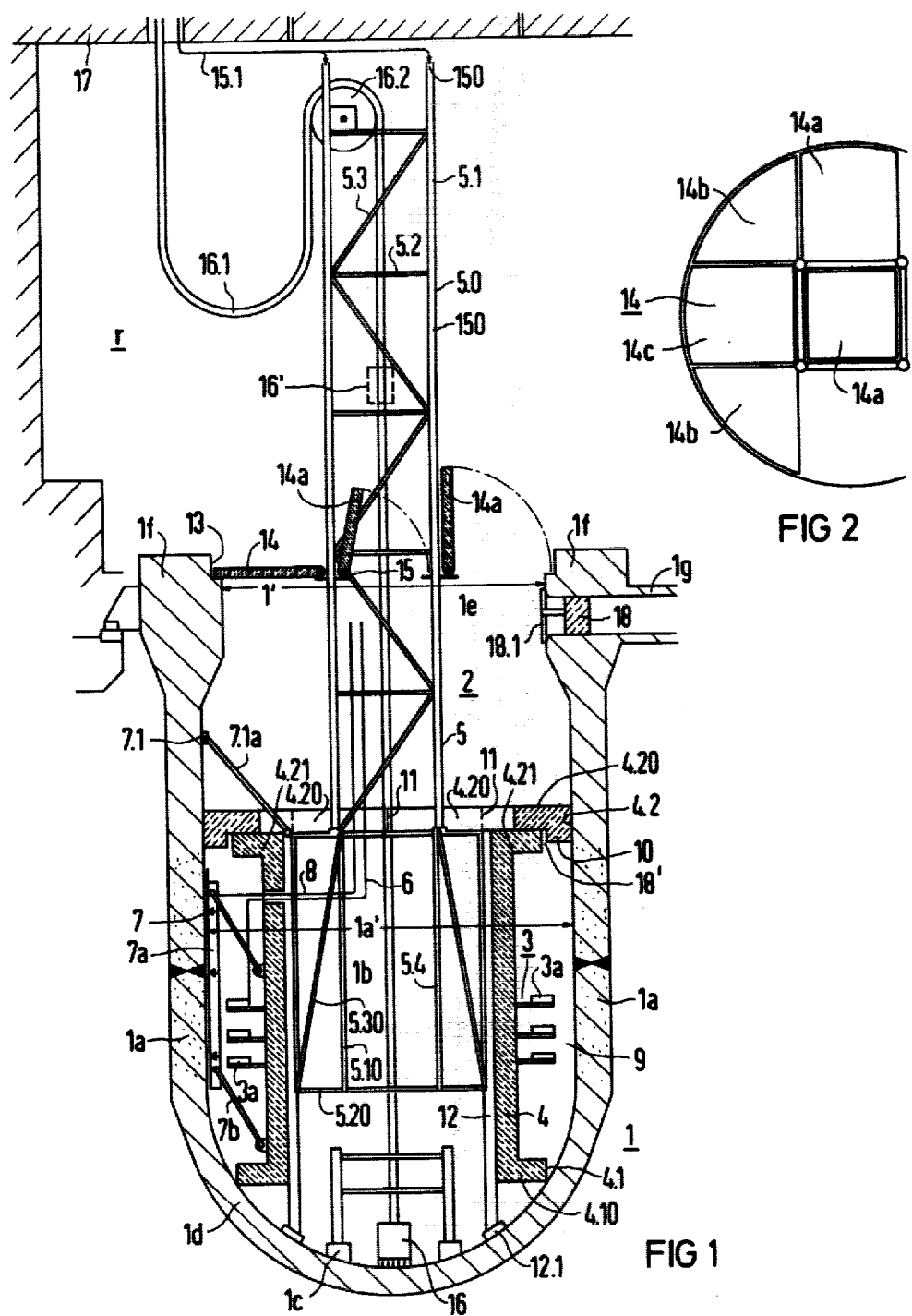

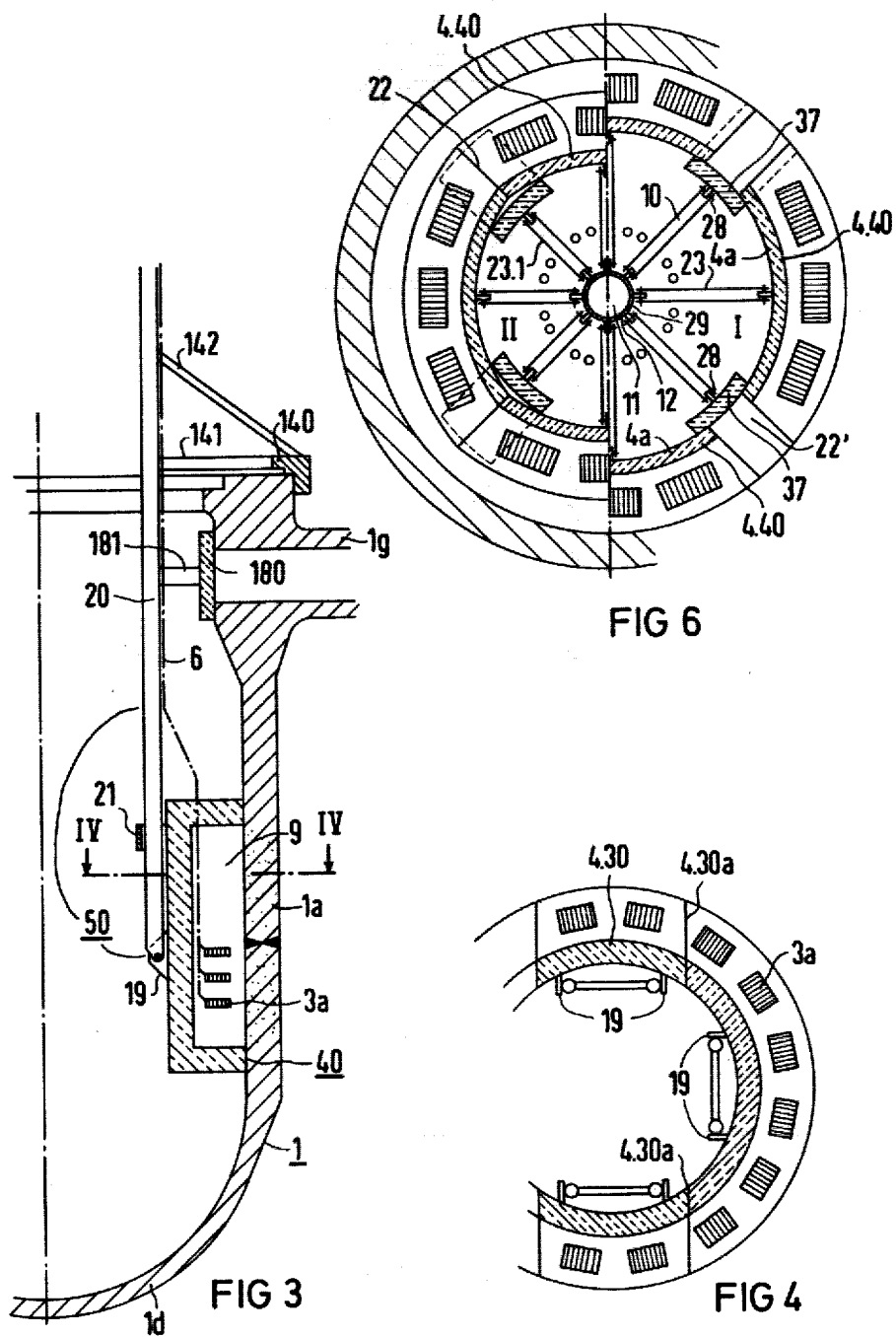

HEAT-TREATING APPARATUS FOR PROLONGING THE LIFE OF A PRESSURE VESSEL, ESPECIALLY A REACTOR PRESSURE VESSEL

The invention relates to heat-treating apparatus for prolonging the life of a pressure vessel, especially a reactor pressure vessel the temperature-resistant material of which is subjected to time-dependent structural changes due to neutron fluence. Such a heat-treating device, more particularly, has a heating device which can be set in place within the pressure vessel adjacent a wall portion of the pressure vessel to be treated. Also provided is a mounting support for the heating device having a hollow, substantially cylindrical mounting member, supported on a supporting device by which it is insertable into and removable from the pressure vessel through an opening thereof, the interior of the pressure vessel and the reactor chamber being flooded when inserting and removing the heating device, and the flooding water being drained out of the emptied reactor vessel interior to perform the heat treatment.

Such apparatus has become known heretofore from German Published Non-Prosecuted Application DE-OS No. 2 322 118 wherein the supporting device has a cover, by which the pressure vessel opening is closed off tightly after the heating device is inserted, so that the pressure vessel, after being drained, but with the reactor room flooded, can be subjected to a heat treatment. If the cover gasket or seal which may be especially an inflatable sealing ring, should fail, water can break through from the reactor room into the interior of the pressure vessel, which can cause even more embrittlement than had existed prior to the heat treatment and was to be eliminated by the latter. It is, furthermore, impossible to control accurately gradual temperature differences with the heretofore known apparatus because zones located outside the heat treatment zones can attain temperatures higher than desired. The heat treatment zone is supposed to encompass, preferably, the wall portions of the pressure vessel which are in the vicinity of the axial region of the reactor core and are embrittled by the neutron flux. It can further be stated that the parts which are connected to the reactor pressure vessel and are firmly installed therein cannot be protected effectively against heat flux from the pressure vessel wall by means of the heretofore known device. Such a part is, for example, the secondary core support in the region of the bottom spherical shell. To this is added the fact that the secondary core support, because the material thereof is different from that of the pressure vessel, has a different coefficient of expansion. Thus, the reactor pressure vessel is formed of an alloyed carbon steel with austenitic cladding on the inside, but the secondary core support is formed of austenitic material. It should further be pointed out that in the heretofore known apparatus, the inner diameter of the vessel opening is virtually not reduced when compared to the maximal inner diameter of the vessel. In practice, however, it is often the situation that the vessel flange is drawn inwardly in the region of the cover parting line of the pressure vessel, and the nozzles of the reactor coolant lines, especially the outlet or discharge nozzle, project into the interior of the vessel.

It is accordingly an object of the invention to provide heat-treating apparatus of the foregoing type wherein more accurate control of the temperature for the wall portions of the pressure vessel to be treated is possible and the heating of parts of the pressure vessel located outside the treatment zone or connected thereto to excessively or undesirably high temperatures is avoided. It is further an object to provide such apparatus as to permit the heating device to be inserted into pressure vessels, having an inner diameter in the region of its cover opening thereof which is smaller than the inner diameter in the region of the treatment zone of the pressure vessel.

With the foregoing and other objects in view, there is provided, in accordance with the invention, a heat-treating apparatus for prolonging the life of a pressure vessel formed of thermally resistant material subject to time-dependent structural changes due to neutron flux comprising an heating device positionable within a pressure vessel adjacent to a wall portion thereof which is to be heat-treated; and a mounting support for the heating device comprising a hollow substantially cylindrical mounting member; means for supporting mounting member and for inserting the mounting member into and for removing the mounting member from the pressure vessel through an opening in the pressure vessel; means for flooding the interior of the pressure vessel with protective liquid preparatory to inserting and removing the mounting member and the heating device from the pressure vessel; and means for draining the protective liquid from the interior of the pressure vessel prior to actuation of the heating device for heating the adjacent wall portion, the mounting member being an insulating cylinder having outer circumferential contact surfaces and being positionable so that the contact surfaces form sealing contact with the inner peripheral surface of the pressure vessel in a manner that the insulating cylinder defines an annular heating space located adjacent the pressure-vessel wall portion to be treated. The advantages obtainable with the invention are, particularly, that with defined temperature control in the heating zone, reactor parts outside the heating zone remain below an undesirable temperature level, that the possibility of water penetration or break-in during the heating process is absolutely excluded, and that the heating device can be inserted also into pressure vessels having a vessel opening which is narrower than the inner diameter in the region of the treatment zone.

In accordance with another feature of the invention, the pressure vessel is a reactor pressure vessel and is received in a reactor chamber, the flooding and the draining means serving also for respectively flooding and draining the reactor chamber in addition to the pressure vessel, the reactor room being vacant and being shielded by ceiling slabs during actuation of the heating device for heat-treating the adjacent wall portion of the pressure vessel.

In accordance with a further feature of the invention, the mounting member is formed of adjustable segments, the contact surfaces being located, at least at the upper end of the mounting member, so that the mounting member is insertable into the interior of the pressure vessel with an outer diameter smaller than the inner diameter of the pressure-vessel opening, and is then adjustable to an outer diameter corresponding to the inner diameter of the wall portion of the pressure vessel to be treated.

In accordance with an added feature of the invention, the mounting member is formed of adjustable segments and has a respective flange at upper and lower ends thereof, the contact surfaces being located at the flanges, the adjustable segments being supported at least at the upper flange.

In accordance with an additional feature of the invention, the heat-treating apparatus includes temperature measuring elements supported at the mounting member and being swingable radially outwardly and movable into contact with the pressure-vessel wall portion to be heated, a measuring beam carrying the temperature-measuring elements, and a linkage controllably mounting the measuring beam at the outer circumference of the mounting member for bringing the measuring beam in and out of contact with the pressure vessel wall.

In accordance with a more specific feature of the invention, the measuring beam is oriented axially parallel to the pressure vessel.

In accordance with yet another feature of the invention, the mounting-member supporting means comprise a cover plate seatable on the pressure vessel in the region of a cover flange thereof, the cover plate having parts thereof movable so as to open the pressure vessel for controlling temperature distribution in a pressure vessel space located within the mounting member in the pressure vessel and also in the annular heating space.

In accordance with a more particular feature of the invention, the movable parts of the cover plate are pivotable flaps.

In accordance with yet a further feature of the invention, the mounting-member supporting means comprise a central mast having cooling-air lines extending therethrough for aerating the pressure-vessel space located within the mounting member in the pressure vessel.

In accordance with an even more specific feature of the invention, the central mast is formed of struts, at least one of which is of hollow construction for conducting cooling air.

In accordance with yet an added feature of the invention, the mounting member is subdivided over the circumference thereof into a plurality of segments separated by continuous axial parting lines from one another, the mounting-member supporting means comprising separate supporting devices from which the respective segments are suspended and by which the segments are successively insertable into the interior of the pressure vessel and mutually joinable sealingly with axial parting lines into a cylindrical member closed upon itself.

In accordance with yet an additional feature of the invention, the mounting member is subdivided over the circumference thereof into a plurality of segments separated by continuous axial parting lines from one another, the mounting-member supporting means comprising a central mast, spreader levers articulatingly connecting the segments to the central mast in a manner that the segments spread out radially with respect to the central mast upon axial displacement of the central mast relative to the segments, and means for sealing respective gaps formed at the axial parting lines by the spreading of the segments.

In accordance with another feature of the invention, the heat-treating apparatus includes a cover plate closing the pressure-vessel opening, and means for suspending the segments from the cover plate, the cover plate being formed with an opening through which the central mast axially displaceably extends while affording relative motion to the segments, respectively.

In accordance with a further feature of the invention, the means for sealing the gaps formed at the axial parting lines comprise auxiliary segments distributed over the circumference of the first-mentioned segments, the auxiliary segments being shiftable like the first-mentioned segments to a greater diameter and, in enlarged-diameter condition of the mounting member, respectively covering the gaps.

In accordance with an added feature of the invention, the heat-treating apparatus includes heating-gas feeding and discharge lines connected to the heating space located adjacent the pressure vessel wall portion.

In accordance with an additional feature of the invention, the heating device comprises an inductor winding carried by the mounting member for inductively heating the pressure-vessel wall portion.

In accordance with a concomitant feature of the invention, the mounting member is formed of adjustable segments spreadable apart from one another to a greater diameter, the inductor winding having turns with flexible turn sections of such length as to bridge the increased circumference of the turns as the segments are spread apart.

Other features which are considered as characteristic for the invention are set forth in the appended claims.

Although the invention is illustrated and described herein as embodied in heat treating apparatus for prolonging the life of a pressure vessel, especially a reactor pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic front elevational view, partly in section, of a first embodiment of a heat treatment device according to the invention received in a reactor pressure vessel;

FIG. 2 is a fragmentary top plan view of FIG. 1 showing the cover of the heat treatment device;

FIG. 3 is a view similar to that of the right-hand half of FIG. 1 showing a second embodiment of the heat-treating device of the invention received in a reactor pressure vessel;

FIG. 4 is a cross-sectional view of FIG. 3 taken along the line IV—IV in direction of the arrows;

FIG. 6 is a cross-sectional view of FIG. 5; the left-hand side being taken along the line VI—VI thereof, while the right-hand side is taken along the line VI—VI at a different operating phase thereof, the auxiliary segments being also shown in greater detail;

Figure 5:
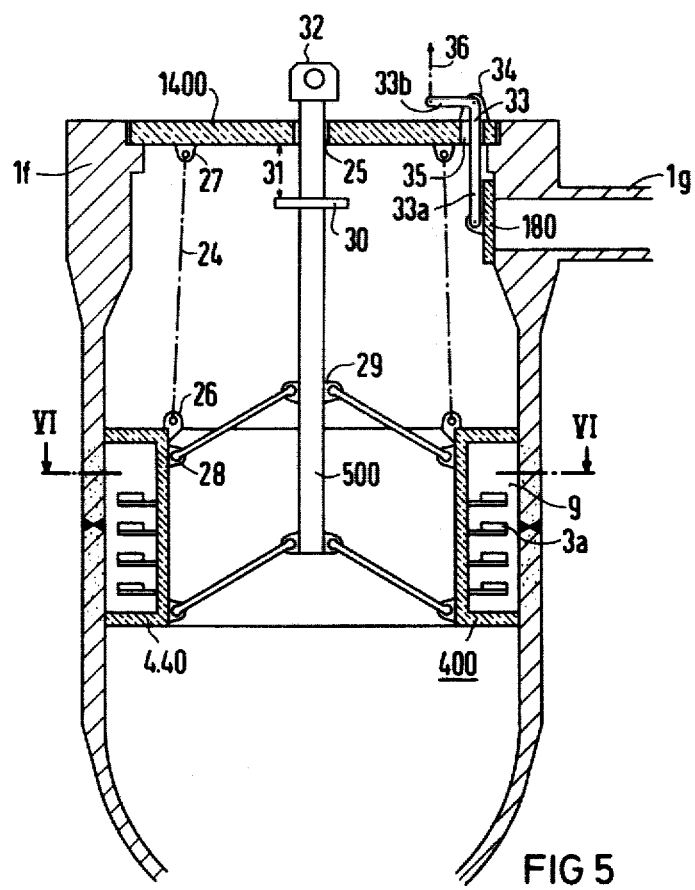
FIG. 5 is a view similar to that of FIG. 1 of a third embodiment of the heat-treating device of the invention with segments supported at a central mast of the apparatus by means of spreader levers.

Referring now to the drawing and first, particularly to FIG. 1 thereof, there is shown a nuclear reactor pressure vessel 1 which is formed of heat-resistant alloy steel, the wall portions 1a of which shown with stippling being especially exposed during operation to the neutron radiation emanating from the reactor core and being therefore, subjected to a change in structure tending toward material embrittlement. This can result in having to remove the pressure vessel 1, for example, after 20 years of operation, and to replace it by a new one. The life of the pressure vessel 1 can be extended, however, by a heat treatment based upon recovery-tempering with the hereinafter-described device. The device, identified as a whole by reference numeral 2, is made up of heating equipment 3 which can be set in place adjacent to the wall portions 1a of the pressure vessel 1 in the interior 1b thereof, which are to be treated. As is apparent, in this regard, the internals are removed from the pressure vessel 1 except for a secondary core support or bolster 1c in the vicinity of the spherical bottom 1d. A reinforced vessel-flange 1f, at which normally a non-illustrated pressure-vessel cover is sealingly tightened or clamped by means of flange bolts, surrounds a vessel opening 1e which has a smaller inner diameter 1' than the inner diameter 1a' in the wall region 1a of the pressure vessel 1 which, as illustrated in FIG. 1, in the main, has a pot or cup-shaped hollow cylindrical appearance with a spherical bottom 1d. One of the reactor coolant lines 1g of the pressure vessel 1 is shown in FIG. 1; three inlet and three outlet lines, for example, should be throught of as being distributed uniformly over the circumference of the pressure vessel 1, in a plane normal to the axis of the illustrated coolant line.

The mounting support for the heating equipment or device 3 is formed of a substantially cylindrical, thermally insulating mounting member 4, which is supported on a supporting device identified as a whole by reference numeral 5, by means of which the mounting member 4 is insertable through the vessel opening 1e into the pressure vessel 1 and removable therefrom. Supply cables 6 are provided for the heating elements 3a, which are mounted at the outer circumference of the mounting member 4, as well as measuring lines 8 for a movable measuring beam 7a holding a thermocouple element 7. The measuring beam 7a is mounted in a parallelogram linkage or lever system 7b in such a manner that it can be brought from an inwardly swung transport position into the illustrated measuring position thereof, wherein the thermocouple elements 7 thereof engage the inner circumference of the wall 1a. The mounting member 4 is able to be brought into tight engagement sealingly with the inner peripheral surface of the pressure vessel 1 by means of contact surfaces 4.1 and 4.2 of the outer periphery thereof in such a manner that the mounting member 4 defines an annular heating space 9 adjoining the pressure vessel wall portion 1a to be treated. The contact surfaces 4.1 are located at the outer circumference of a lower mounting member flange 4.10; in the illustrated inserted position of the device, the contact surfaces 4.1 sealingly engage the upper region of the spherical inner peripheral surfaces.

Upper contact surfaces 4.2 are provided on mounting member segments 4.20. In the illustrated embodiment of FIG. 1 these segments 4.20 have a somewhat L-shaped cross section which is of such dimensions that the segments 4.20 can be inserted into the annular gap between the upper ring flange 4.21 of the mounting element 4 and the inner periphery of the pressure vessel 1, if lower contact surfaces 4.1 of the mounting member 4 engage the inner periphery of the spherical bottom 1d. The segments 4.20 form a segment ring closed upon itself with respective separating or parting gaps 11 and formed, for example, of six similar segments 4.2 which, with L-profiles, lying on a side horizontally, have the short L-leg thereof engaging the inner periphery of the pressure vessel 1, and the longer L-leg thereof disposed horizontally on the upper side of the ring flange 4.21 of the mounting member 4. In this manner, the mounting member 4 with the lower ring flange 4.10 thereof and the upper ring flange 4.21 thereof can be introduced through the vessel opening i.e. especially through the narrow location of the inner diameter 1e into the interior of the vessel and, then, the mounting member 4 is adjusted to the inner diameter 1a' of the wall portion 1a to be treated by bringing the mounting member segments 4.20 into position. As is apparent, the contact surfaces are provided at the flange 4.21 and 4.10 of the mounting member 4, the adjustable mounting member segments 4.20 with the contact surfaces 4.2 being supported on the upper ring flange 4.21. In this first embodiment according to FIG. 1, the adjustable mounting member segments 4.20 are provided in the region of the upper ring flange 4.21 only because the outer diameter of the lower ring flange 4.10, due to the curvature of the spherical bottom 1d, is, on the one hand, large enough to make a tight seal, and on the other hand, small enough so that it can be passed through the vessel opening 1e with the inner diameter 1'.

The supporting device 5 has a lattice mast 5.0 with longitudinal struts 5.1, transverse struts 5.2 and diagonal struts 5.3. In the region of the mounting member 4, the lattice mast 5.0 has a cage-like extension 5.4 with outer dimensions which are somewhat smaller than the inner dimensions of the mounting member 4 and formed of longitudinal, transverse and diagonal struts 5.10, 5.20 and 5.30, respectively. Instead of the transverse struts 5.20, suitable ring plates can also be used. The outer longitudinal struts 5.10 have connected thereto support legs 12, which likewise extend in longitudinal direction and have support feet 12.1 linked to the ends thereof. These support legs 12, which are fastened to the cage-like extension of the lattice mast 5.0, serve simultaneously for connecting the mounting member 4 to the lattice mast structure i.e. the entire supporting device 2 with the mounting member 4 and the heating elements 3a is supported or braced thereby. In accordance with a non-illustrated variation thereof, the support legs 12 are also mountable so as to be longitudinally movable relative to the mounting member 4 in such a way that a controllable contact pressure of the contact surfaces 4.1 against the spherical bottom 1a can be attained if the supporting device 2 is braced at the feet 12.1. The lattice mast 5.0 passes through a cover 14 which is seatable on a shoulder 13 of the cover flange 1f and is connected to the lattice mast 5.0 by means of suitable hardward or fittings 15. To control the temperature distribution in the pressure vessel space 1b within the mounting member 4 and, therefore, also indirectly to control the temperature within the heating space 9, parts of the cover 14 are constructed as flaps 14a. These flaps 14a are openable and closable especially by remote control by conventional non-illustrated means; sliders (likewise non-illustrated) may also be provided instead of the flaps 14a. In FIG. 1, two such flaps 14a are shown in opened condition thereof while, in the top plan view of FIG. 2, the cover 14 is shown with the flaps 14a thereof closed. The segments 14b are fixed portions of the cover 14 and are not constructed as flaps.

As represented by the arrows 150, cooling air can be blown into the space 1b through the longitudinal struts 5.1 of the lattice mast 5.0 which are constructed as hollow grid members. To this end, cooling air lines, diagrammatically represented at 15.1, are connected to the upper ends of the longitudinal struts 5.1. It is, of course, also possible to install separate cooling air lines on the lattice mast 5.0 instead of using the longitudinal struts 5.1. A submersible pump 16, which can be lowered to the lowest region of the buttom spherical shell 1d, permits the reactor space 1b to be pumped dry. A flexible pump line 16.1 extends over a deflecting pulley 16.2, which is mounted in the upper portion of the lattice mast 5.0, and after being formed with a predetermined S-shaped sag passes through suitable passageway openings in the ceiling lock 17 to the outside. In a similar manner, the cooling air lines 15.1, as well as the measuring lines 8 and the heater lines 6, are also brought to the outside. An intermediate position of the submersible pump 16 which is indicated in broken lines at 16', is occupied thereby before being lowered to the bottom or after it is pulled up therefrom. The submersible pump line 16.1 serves, on the one hand, as a pressure line and, on the other hand, as a support cable for the pump 16 and is formed for this purpose of an armored flexible hose. The reactor chamber r is drained of water during the heating operation, adequate shielding being provided by the ceiling locks or slabs 17.

Another thermocouple element 7.1, which is movable, is fastened to a movable swivel arm 7.1a which is, in turn, pivotally mounted on one of the support legs 12. The measuring lines for the thermocouple element 7.1 are not shown here, and also not shown is the conventional swivel mechanism which serves for swiveling the arm 7.1a preferably by remote control. Before the heat treatment is started, the main reactor coolant lines 1g are closed off by insulating plugs or stoppers 18 which, for example, are inflatable by compressed air or expandable. A linkage or lever system 18.1 is provided for inserting and withdrawing these insulating plugs or stoppers 18. The deflection pulley 16.2 forms part of an otherwise non-illustrated pump-lifting mechanism. The mounting member 4 is constructed so as to be flush with the wall of the pressure vessel 1 and prevent heat transfer. The heat seal at the top of the mounting member 4 is affected by the mounting member segments 4.20, which are placed in position under water after the device has been inserted and, due to the overlap thereof, prevent convection flow through the gaps 18'. The fixed cover segments 14b (FIG. 2) assume the function of holding or supporting the lattice mast 5.0 (protection against tipping or overturning), whereas the movable flaps 14a in conjunction with the cooling air stream 150 serve to control the air temperature in the spaces 1b and 9. The hereinaforedescribed device is connected by means of the measuring and supply cables to a commercially available, conventional control and regulating device outside the reactor chamber r. In addition to being provided by the surrounding walls, shielding is also afforded by the hereinaforementioned ceiling locks or slabs 17. The heat-treating apparatus is inserted with the pressure vessel cleaned out, however, under water. The water serves, in this regard, as shielding medium. Once the apparatus has been brought into the position thereof shown in FIG. 1, the water can then be drained by means of the submersible pump 16 from the interior of the pressure vessel and the reactor chamber r, after the ceiling locks or slabs 17 have been placed in position. The heating elements 3a are conventional electric resistance elements which heat the wall portions 1a that are to be treated. What is important is that a partial heat treatment can by performed by these heating elements 3a i.e. a treatment only of those wall portions, wherein embrittlement must be eliminated, whereas other wall portions remain practically unaffected by the temperature treatment.

FIGS. 3 and 4 show a second embodiment of the invention wherein, contrary to FIGS. 1 and 2, each mounting member segment 4.30 is suspended from a separate supporting device 50 and, in fact, so that the segments 4.30 are insertable into and removable from the interior of the vessel one after the other. The segments 4.30 adjoin and engage one another heat-sealingly in the region of adjoin and engage one another heat-sealingly in the region of axial separating or parting lines 4.30a thereof and thereby form a closed ring assembly (note FIG. 4) so that no separate auxiliary segments are required. In the embodiment illustrated in FIGS. 3 and 4, four segments 4.30 are provided which are distributed over the circumference, and each of which, in turn, is provided with articulated straps 19, to each of which a beam 20 is linked or hinged. A bracket 21 at the inner periphery of the mounting member 40 or at the inner periphery of the respective segments 4.30 prevents the segments 4.30 from tipping or overturning when they are being inserted or removed. Instead of a sealing plug for the reactor coolant line 1g as in the embodiment of FIGS. 1 and 2, a sealing disc 180 is used in the embodiment of FIGS. 3 and 4, and is fastened by means of a rod 181 to the respective beam 20. The cover 140, like the segmented mounting member identified as a whole by the reference numeral 40, is subdivided into individual segments 141 which result likewise in a sealing cover assembly closed on itself after all of the segments 141 thereof have been set in place. Corresponding stiffening and holding struts 142 are provided for the respective cover segments 141. The struts 142 are fastened to one end thereof to the beam 20 and at the other end thereof to the respective segments 141. In addition, those parts in the embodiment of FIGS. 3 and 4 having like-functioning counterparts in the embodiment of FIGS. 1 and 2 are provided with the same reference characters. The heat-treatment process is carried out in a manner analogous to that described hereinbefore.

In a third embodiment of the invention according to FIGS. 5 and 6, the mounting member 400 is subdivided into several segments 4.40 separated from one another by means of continuous axial parting lins 22 (note FIG. 6), and these segments 4.40 are supported at a central mast 500 by means of spreader levers 23 in such a manner that the segments are spread out radially relative to the central mast 500 when the latter is shifted axially relative to segments 4.40. The segments 4.40 are thereby suspended by pull or traction cables 24 (articulated rods may also be used in place thereof) from a cover plate 1400; the central mast 500 axially removably passing through passageway opening 25 formed in the cover plate 1400, while affording relative movement with respect to the individual segments 4.40. The tension cables 24 are suspended in suitable shackles or straps 26 and 27 provided on the respective segments 4.40 and the cover 1400. The spreader levers 23 are linked at respective articulating shackles 28 which are fastened to the inner periphery of the segments 4.40 at the outer ends thereof and, at the inner end thereof, articulatingly connected to shackle spider or stars 29 which are fastened to the central mast 500. A ring collar 30 firmly seated on the central mast 500 is spaced such a distance 31 from the cover 1400 that when lifting the heat-treating device, the segments 4.40 are first spread inwardly and, in the last part of this inwardly-spreading stroke, the ring collar 30 entrains the cover 1400. For this purpose, the central mast 500 is provided, at the upper end thereof, with a suspension eye 32 for a non-illustrated crane hook or the like. The sealing disc or plate 180 for the main reactor coolant line $l_g$ is fastened, in this embodiment of FIGS. 5 and 6, to a rocking lever linkage 33, which is pivotally mounted in a bearing block 34 of the cover 1400 and has a lever 33a which extends through a passageway opening 35 formed in the cover 1400 in such a manner as to permit rocking or pivoting movement. An actuating linkage is diagrammatically indicated by the arrow 36 and is articulatingly connected to the outer lever arm 33b and preferably serves for remote control.

FIG. 6 shows that for sealing the axial parting lines 22 between tangentially adjacent segments 4.40, auxiliary segments 37 are provided which are distributed over the circumference of the segments 4.40 and are shiftable or displaceable, like the segments 4.40, to greater diameters and, in the enlarged-diameter condition of the mounting member 400, cover the tangential gaps 22' between the spread-apart segments 4.40, forming a seal for the thermal flux. Like the segments 4.40, the auxiliary segments 37 are linked or articulatingly connected by spreader levers 23.1 to the central mast 500, these spreader levers 23.1 being somewhat shorter radially than the spreader levers 23. Shackles 28 again serve as pivots for the outer ends of the spreader levers 23.1 and, for the inner ends thereof, a shackle spider 29. Moreover, parts having functions identical to those in the first and second embodiments of FIGS. 1 and 3, respectively, are also provided with the same reference characters. The heat treatment in the embodiment of FIGS. 5 and 6 is performed in a manner analogous to that described in connection with the first embodiment of FIG. 1.

Figure 7:
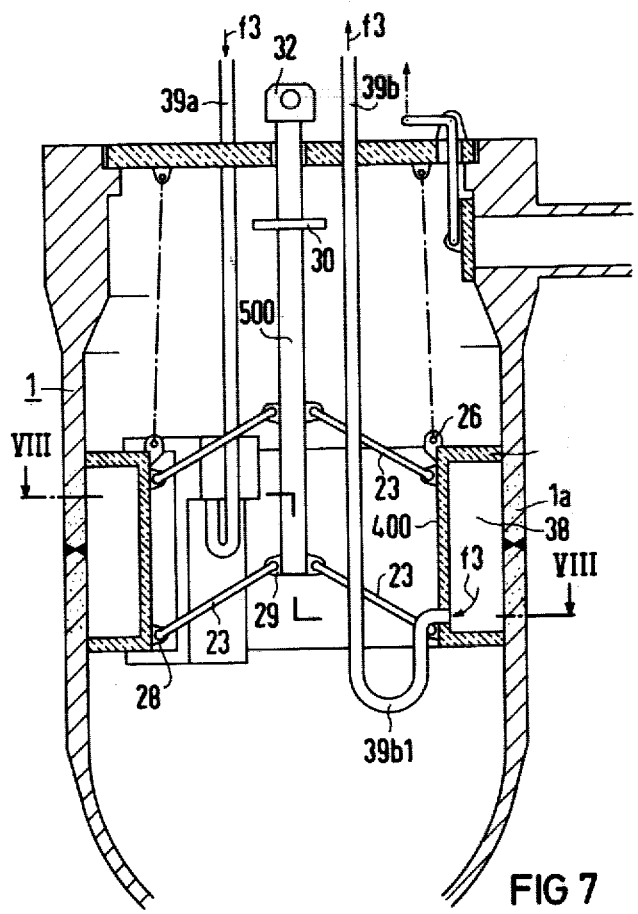
FIG. 7 is a view similar to that of FIG. 5 of a fourth embodiment of the device according to the invention wherein a spreader lever mechanism for the segments is likewise provided, but wherein the heating is effected by means of hot gas.
Figure 9:
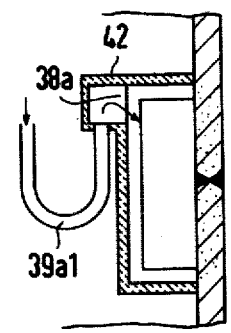
FIG. 9 is a fragmentary sectional view of FIG. 8 taken along the line IX—IX.
Figure 8:
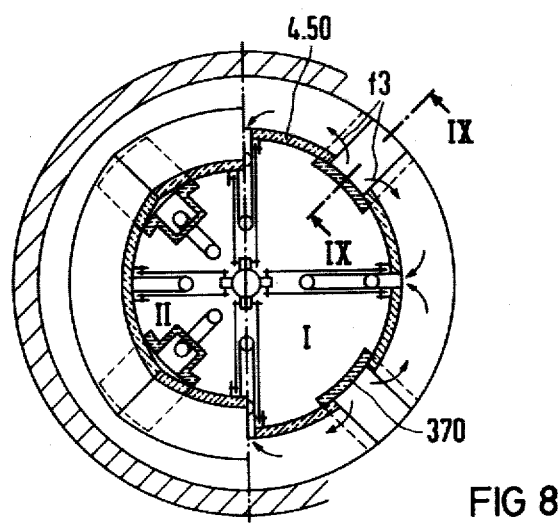
FIG. 8 is a cross-sectional view of FIG. 7 taken along the line VIII—VIII in direction of the arrows.

In a fourth embodiment of the invention shows in FIGS. 7, 8 and 9, segments 4.50 and auxiliary segments 370, in conjunction with the wall portion 1a, with which they can be brought into tight engagement in a manner corresponding to that in the third embodiment of FIGS. 5 and 6, form a heating-gas chamber 38 and, in the heating position or stage I thereof, shown in the right-hand side of FIG. 8 as well as in FIG. 7. Gas feed lines 39a and gas discharge lines 39b are connected to the heating gas chamber 38. The heating medium can be hot air, for example; however, it is also possible to use an inert gas if the material of the vessel wall that is to be heated has a tendency toward undesirable oxidation. The gas feed line 39a is connected by an elbow 39a1 having a U-shaped bend (note the detail according to FIG. 9) to an upper inlet chamber part 38a of the heating-gas chamber 38, while the gas discharge line 39b is connected likewise by a tube elbow 39b1 having a U-shaped bend to the lower region of the heating-gas chamber 38 by passing through a circumferential wall of the segments 4.50. The connecting locations for the gas feed lines 39a are formed by box-like projections 42 protruding beyond the inner periphery of the auxiliary segments 370. In the embodiment of the invention shown in FIGS. 7 to 9, each of the four auxiliary segments 370, respectively, associated with each quadrant is connected to a gas feed line 39a and, also, each of the segments 4.50 of the four quadrants, respectively, to a gas discharge line 39b. The hot gas flows are diagrammatically represented by the arrows f3. In this embodiment of FIGS. 7 to 9, the segments 4.50 and the auxiliary segments 370 are again linked, as in the third embodiment of FIGS. 5 and 6, to spreader levers 23, like parts being identified by the same reference characters as those in the third embodiment of FIGS. 5 and 6. In the fourth embodiment, as well as in the hereinaforedescribed third embodiment of the invention, the weight per se of the central mast 500 can be made so large that it exerts adequately large spreading forces upon the segments 4.50 and 370 or 4.40 and 37, respectively. The heat treatment is performed as explained hereinbefore; for reasons of simplification, the submersible pump, the thermal measuring elements and other details shown in FIG. 1 are not illustrated in the second to the fourth embodiments shown in FIGS. 3 to 9.

Figures 10, 11:
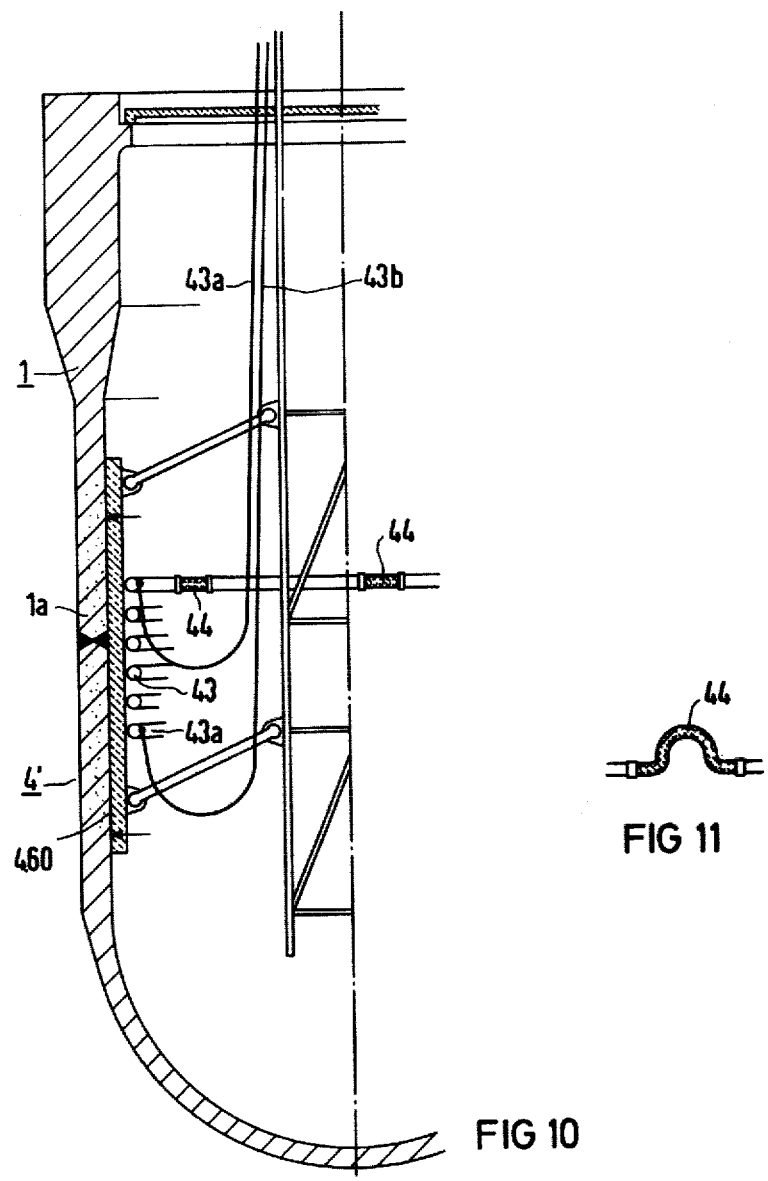
FIG. 10 is a view similar to that of the left-hand half of FIG. 1 showing a fifth embodiment of the device according to the invention with spreadable segments which are constructed as supports of inductor heater windings.
FIG. 11 is an enlarged fragmentary plan view of FIG. 10 showing a flexible section of a turn or winding of the inductor winding coil.

In a fifth embodiment of the invention according to FIGS. 10 and 11, the segments 4.60 and non-illustrated auxiliary segments of a mounting member 4' are constructed as support or carrier for an inductor winding 43. An alternating electromagnetic field which is producible by the inductor winding 43 passes through the insulation of the segments 4.60 and produces eddy currents in the wall portion 1a of the pressure vessel 1, which likewise cause heating of the wall portion 1a to recovery temperature. Electricity is provided by an a-c feed line 43a and a return line 43b which are in the form of a flexible power cable. In order that the inductor turns of the winding 43 may follow the spreading motion, when the spreading occurs and come to rest against the inner circumference of the mounting member 4', the winding turns are provided with flexible turn sections 44 which can be pushed together in loop-shaped manner. The turn sections 44, as can be seen, bridge the increase in circumference of the turns 43a in the stretched condition of the turn sections 44, which is experienced by the latter when the turns are spread apart. FIG. 11 shows such a flexible loop-shaped, compressed section 44 of a turn in the as yet not spread-not condition of the mounting member 4' or of the segments 4.60 thereof. The advantage of the hereinaforedescribed inductor winding 43 is, among other things, that no gas chambers to be sealed from the outside are formed at the inner circumference to the wall portion 1a; rather, in the main, only the radiation losses have to be kept within limits, which can be achieved in an advantageous manner by providing the mounting member 4' with a mirrored surface at the outer circumference thereof. This measure is, incidentally, also of advantage for the first to the fourth embodiments of the invention herein. In order to prevent excessive radiation losses from occurring at the outer circumference of the pressure vessel 1 which is to be subjected to the heat treatment, insulation, such as non-illustrated temperature-resistant metal foil insulation, for example, can also be provided thereat.

There are claimed:

1. Heat-treating apparatus for prolonging the life of a pressure vessel formed of thermally resistant material subject to time-dependent structural changes due to neutron flux comprising a heating device positionable within a pressure vessel adjacent to a wall portion thereof which is to be heat-treated; and a mounting support for the heating device comprising a hollow substantially cylindrical mounting member; means supporting said mounting member and for inserting said mounting member into and for removing said mounting member from the pressure vessel through an opening in the pressure vessel; means for flooding the interior of the pressure vessel with protective liquid preparatory to inserting and removing said mounting member and said heating device from the pressure vessel; and means for draining said protective liquid from the interior of the pressure vessel prior to actuation of the heating device for heating the adjacent wall portion, said mounting member being an insulating cylinder having outer circumferential contact surfaces and being positionable so that said contact surfaces form sealing contact with the inner peripheral surface of the pressure vessel in a manner that said insulating cylinder defines an annular heating space located adjacent the pressure-vessel wall portion to be treated, said mounting member being formed of adjustable segments, said contact surfaces being located, at least at the upper end of said mounting member, so that said mounting member is insertable into the interior of the pressure vessel with an outer diameter smaller than the inner diameter of the pressure-vessel opening, and is then adjustable to an outer diameter corresponding to the inner diameter of the wall portion of the pressure vessel to be treated.

2. Heat-treating apparatus according to claim 1 wherein the pressure vessel is a reactor pressure vessel and is received in a reactor chamber, said flooding and said draining means serving also for respectively flooding and draining the reactor chamber in addition to the pressure vessel, the reactor chamber being vacant and being shielded by ceiling slabs during actuation of the heating device for heat-treating the adjacent wall portion of the pressure vessel.

3. Heat-treating apparatus according to claim 1 including heating-gas feeding and discharge lines connected to said heating space located adjacent the pressure-vessel wall portion.

4. Heat-treating apparatus according to claim 1 wherein said mounting member is formed of adjustable segments and said mounting member has a respective flange at upper and lower ends thereof, said contact surfaces being located at said flanges, said adjustable segments being supported at least at said upper flange.

5. Heat-treating apparatus according to claim 1 including temperature measuring elements supported at said mounting member and being swingable radially outwardly and movable into contact with the pressure-vessel wall portion to be heated, a measuring beam carrying said temperature-measuring elements, and a linkage controllably mounting said measuring beam at the outer circumference of said mounting member for bringing said measuring beam in and out of contact with the pressure-vessel wall.

6. Heat-treating apparatus according to claim 5 wherein said measuring beam is oriented axially parallel to the pressure vessel.

7. Heat-treating apparatus according to claim 1 wherein said heating device comprises an inductor winding carried by said mounting member for inductively heating the pressure-vessel wall portion.

8. Heat-treating apparatus according to claim 7 wherein said mounting member is formed of adjustable segments spreadable apart from one another to a greater diameter, said inductor winding having turns with flexible turn sections extensible so as to adjust to the increased circumference of said turns as said segments are spread apart.

9. Heat-treating apparatus according to claim 1 wherein said mounting-member supporting means comprise a central mast having cooling-air lines extending therethrough for aerating the pressure-vessel space located within the mounting member in the pressure vessel.

10. Heat-treating apparatus according to claim 9 wherein said central mast is formed of struts, at least one of which is of hollow construction for conducting cooling air.

11. Heat-treating apparatus for prolonging the life of a pressure vessel formed of thermally resistant material subject to time-dependent structural changes due to neutron flux comprising a heating device positionable within a pressure vessel adjacent to a wall portion thereof which is to be heat-treated; and a mounting support for the heating device comprising a hollow substantially cylindrical mounting member; means supporting said mounting member and for inserting said mounting member into and for removing said mounting member from the pressure vessel through an opening in the pressure vessel; means for flooding the interior of the pressure vessel with protective liquid preparatory to inserting and removing said mounting member and said heating device from the pressure vessel; and means for draining said protective liquid from the interior of the pressure vessel prior to actuation of the heating device for heating the adjacent wall portion, said mounting member being an insulating cylinder having outer circumferential contact surfaces and being positionable so that said contact surfaces form sealing contact with the inner peripheral surface of the pressure vessel in a manner that said insulating cylinder defines an annular heating space located adjacent the pressure vessel wall portion to be treated, said mounting member being subdivided over the circumference thereof into a plurality of segments separated by continuous axial parting lines from one another, said mounting-member supporting means comprising separate supporting devices from which the respective segments are suspended and by which said segments are successively insertable into the interior of the pressure vessel and mutually joinable sealingly with axial parting lines into a cylindrical member closed upon itself.

12. Heat-treating apparatus for prolonging the life of a pressure vessel formed of thermally resistant material subject to time-dependent structural changes due to neutron flux comprising a heating device positionable within a pressure vessel adjacent to a wall portion thereof which is to be heat-treated; and a mounting support for the heating device comprising a hollow substantially cylindrical mounting member; means supporting said mounting member and for inserting said mounting member into and for removing said mounting member from the pressure vessel through an opening in the pressure vessel; means for flooding the interior of the pressure vessel with protective liquid preparatory to inserting and removing said mounting member and said heating device from the pressure vessel; and means for draining said protective liquid from the interior of the pressure vessel prior to actuation of the heating device for heating the adjacent wall portion, said mounting member being an insulating cylinder having outer circumferential contact surfaces and being positionable so that said contact surfaces form sealing contact with the inner peripheral surface of the pressure vessel in a manner that said insulating cylinder defines an annular heating space located adjacent the pressure-vessel wall portion to be treated, said mounting member being subdivided over the circumference thereof into a plurality of segments separated by continuous axial parting lines from one another, said mounting-member supporting means comprising a central mast, spreader levers articulatingly connecting said segments to said central mast in a manner that said segments spread out radially with respect to said central mast upon axial displacement of said central mast relative to said segments, and means for sealing respective gaps formed at said axial parting lines by the spreading of said segments.

13. Heat-treating apparatus according to claim 12 including a cover plate closing the pressure-vessel opening, and means for suspending said segments from said cover plate, said cover plate being formed with an opening through which said central mast axially displaceably extends while affording relative motion to said segments, respectively.

14. Heat-treating apparatus according to claim 12 wherein said means for sealing said gaps formed at said axial parting lines comprise auxiliary segments distributed over the circumference of said first-mentioned segments, said auxiliary segments being shiftable like said first-mentioned segments to a greater diameter and, in enlarged-diameter condition of said mounting member, respectively covering said gaps.

15. Heat-treating apparatus for prolonging the life of a pressure vessel formed of thermally resistant material subject to time-dependent structural changes due to neutron flux comprising a heating device positionable within a pressure vessel adjacent to a wall portion thereof which is to be heat-treated; and a mounting support for the heating device comprising a hollow substantially cylindrical mounting member; means supporting said mounting member and for inserting said mounting member into and for removing said mounting member from the pressure vessel through an opening in the pressure vessel; means for flooding the interior of the pressure vessel with protective liquid preparatory to inserting and removing said mounting member and said heating device from the pressure vessel; and means for draining said protective liquid from the interior of the pressure vessel prior to actuation of the heating device for heating the adjacent wall portion, said mounting member being an insulating cylinder having outer circumferential contact surfaces and being positionable so that said contact surfaces form sealing contact with the inner peripheral surface of the pressure vessel in a manner that said insulating cylinder defines an annular heating space located adjacent the pressure-vessel wall portion to be treated, the pressure vessel being a reactor pressure vessel and being received in a reactor chamber, said flooding and said draining means serving also for respectively flooding and draining the reactor chamber in addition to the pressure vessel, the reactor chamber being vacant and being shielded by ceiling slabs during actuation of the heating device for heat-treating the adjacent wall portion of the pressure vessel, said mounting-member supporting means comprising a cover plate seatable on the pressure vessel in the region of a cover flange thereof, said cover plate having parts thereof removable so as to open the pressure vessel for controlling temperature distribution in a pressure-vessel space located within the mounting member in the pressure vessel and also in said annular heating space.

16. Heat-treating apparatus according to claim 15 wherein said movable parts of said cover plate are pivotable flaps.

* * * * *